Feb. 4, 1958 W. I. UYEHARA 2,821,949
COMBINATION LAND AND WATER VEHICLE
Filed March 18, 1955 3 Sheets-Sheet 1
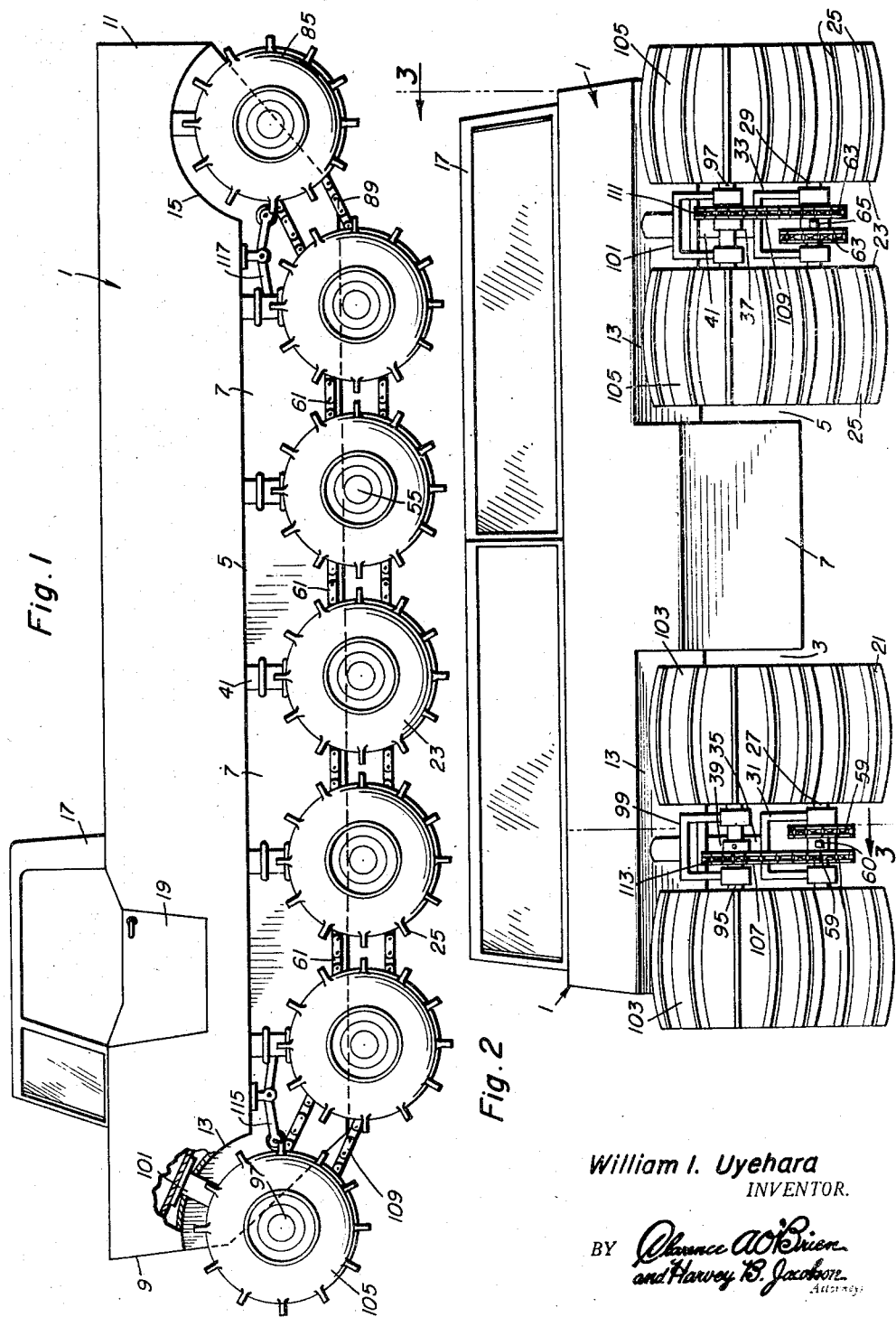
William I. Uyehara
INVENTOR.

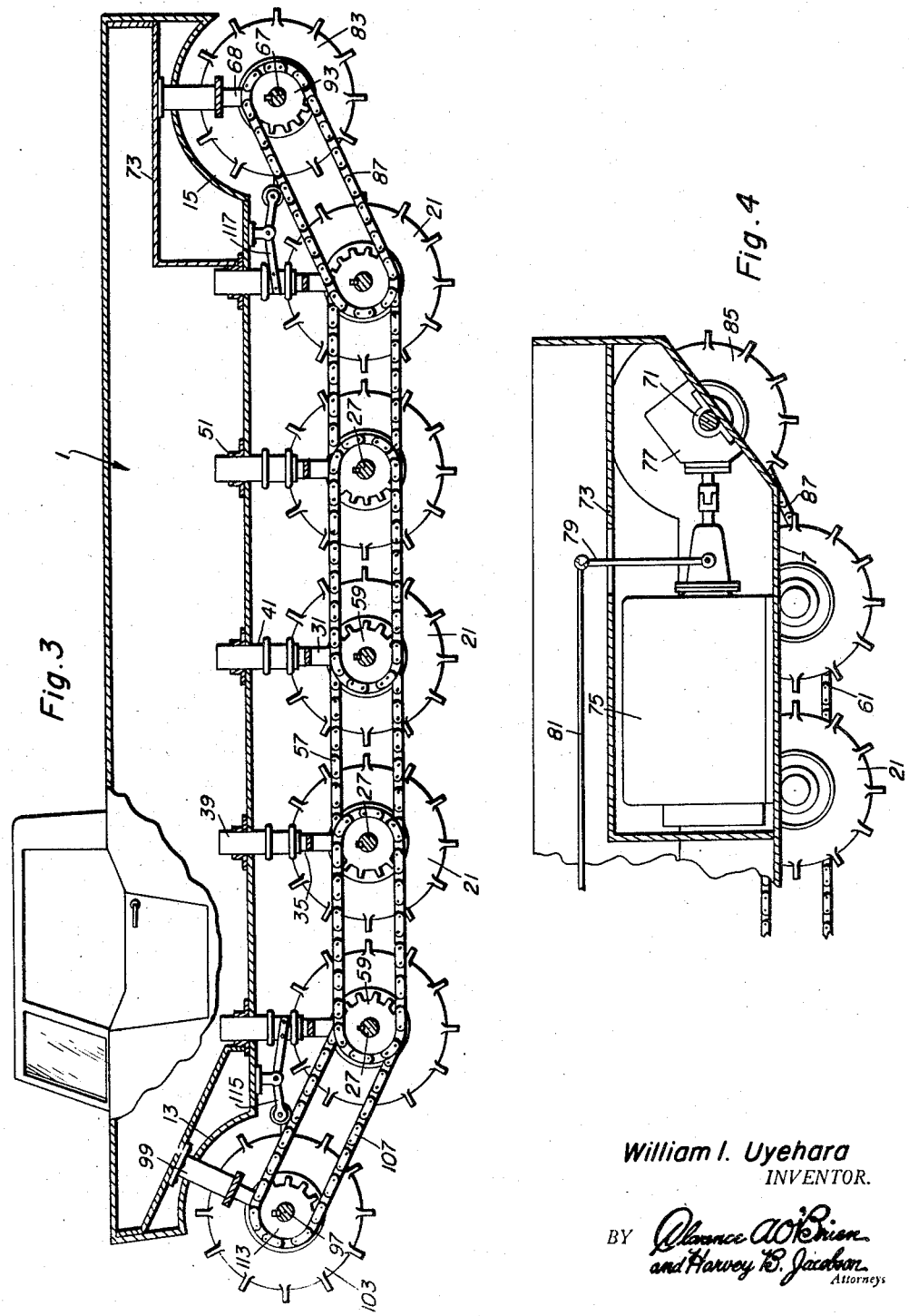

Feb. 4, 1958   W. I. UYEHARA   2,821,949
COMBINATION LAND AND WATER VEHICLE
Filed March 18, 1955   3 Sheets-Sheet 3
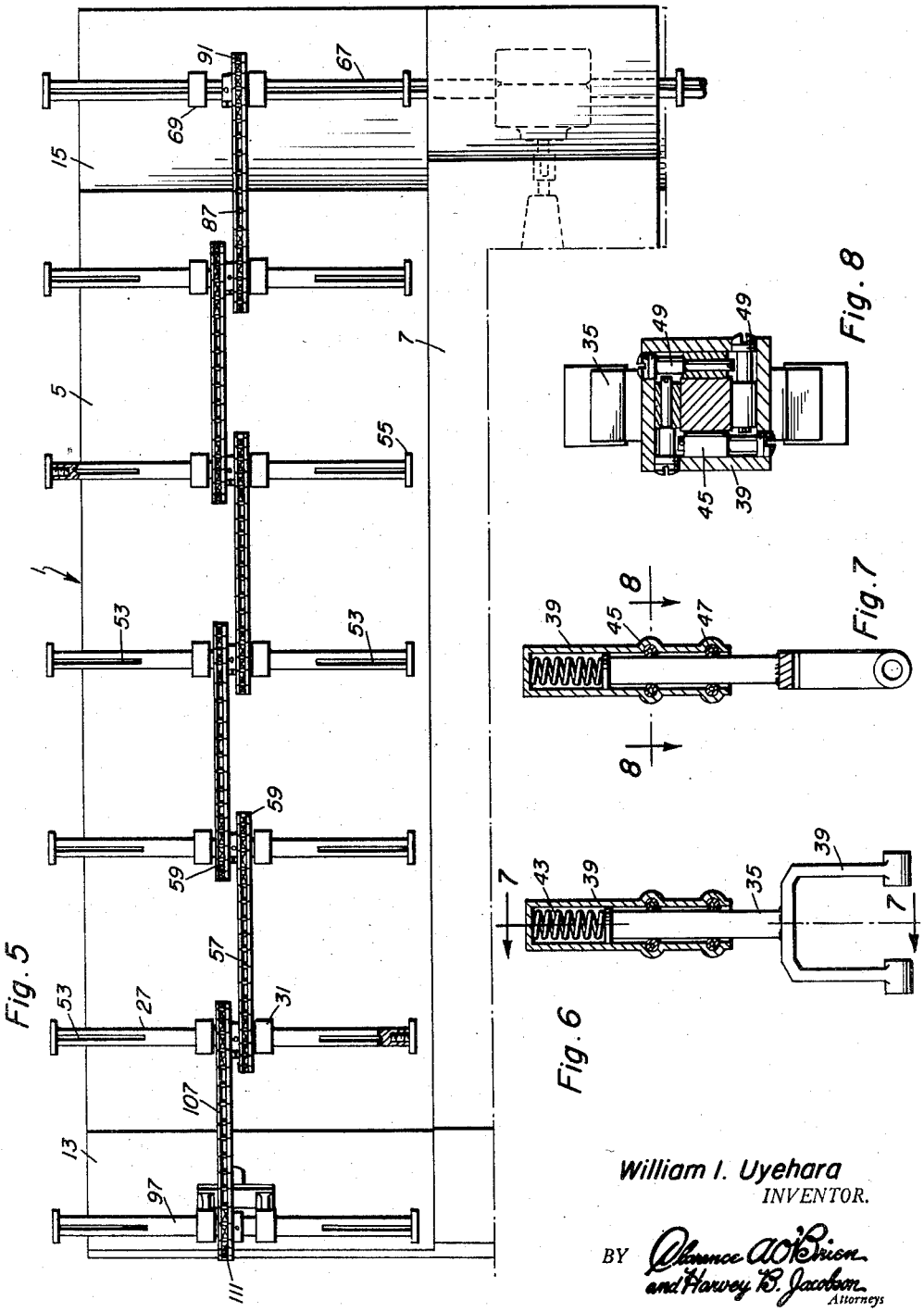
William I. Uyehara
INVENTOR.

United States Patent Office 2,821,949
Patented Feb. 4, 1958

2,821,949

COMBINATION LAND AND WATER VEHICLE

William I. Uyehara, Honolulu, Territory of Hawaii

Application March 18, 1955, Serial No. 495,139

5 Claims. (Cl. 115—1)

My invention relates to improvements in combined land and water vehicles of the pontoon wheel side wheel type.

The primary object of my invention is to provide an all purpose vehicle of the type indicated having main side series of dual pontoon, power driven, traction wheels on each side adapted for propelling effectively both on land or in water, and a body having a low center of gravity and a keel portion adapting the same for maximum stability on land and in water.

Another object is to provide in such a vehicle for mounting pairs of the traction wheels at front and rear ends of the body in raised position relative to the main traction wheels to act as climbing wheels enabling the vehicle to climb up banks of streams and the like and to facilitate driving the vehicle over gulleys and like obstructions.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a view in side elevation of my improved vehicle in the preferred embodiment thereof;

Figure 2 is a view in front elevation of the same, enlarged;

Figure 3 is a view in longitudinal section taken on the line 3—3 of Figure 2 and drawn to a smaller scale;

Figure 4 is an enlarged fragmentary view in central longitudinal section through the rear end portion of the vehicle;

Figure 5 is a view in bottom plan partly broken away and with the wheels removed;

Figure 6 is an enlarged view in vertical section of one of the spring mountings for one of the axles;

Figure 7 is a view in vertical section taken on the line 7—7 of Figure 6; and

Figure 8 is an enlarged view in horizontal section taken on the line 8—8 of Figure 7.

Referring to the drawings by numerals, my improved vehicle comprises an oblong rectangular closed body 1 of suitable sheet metal, preferably having undercut sides forming longitudinal side recesses 3, 5 in said body and a longitudinal central depending keel portion 7 between said recesses. The front and rear ends 9, 11 of said body are undercut to provide front and rear pairs of transverse recesses 13, 15 at opposite sides of the keel portion 7 above the side recesses 3. A suitable front cab 17 for an operator is provided on the body 1 with side doors as at 19.

Two series of main dual, or twin, side driving wheels 21, 23 of the pontoon type are provided to run in the side recesses 3, 5 in axially spaced pairs in each series with the pairs in each series spaced apart longitudinally of the body 1. The main driving or traction wheels 21, 23 are each slightly convex transversely and are provided with suitable circumferentially spaced transverse ribs or blades 25 forming combination traction cleats and paddles on said wheels whereby said wheels are adapted for propelling efficiently on land and in water.

The series of side driving wheels 21, 23 are fixed on side series of axles 27, 29 extending transversely in the side recesses 3, 5 and journaled in upstanding forked bearings 31, 33 interposed between the wheels of the pairs in the series 21, 23.

The bearings 31, 33 have upstanding shanks 35, 37 of square cross-section vertically slidable in vertical fixed sleeves 39, 41 of square cross-section, the shanks being backed by compression springs, as at 43, in said sleeves and whereby said axles 27, 29 and the wheels 21, 23 are mounted for limited cushioned vertical play relative to the body 1. The shanks 35, 37 work between upper and lower sets of roller bearings 45, 47 in the sleeves 39, 41 arranged in rectangular formation in each set on studs 49 threaded into said sleeves. The sleeves 39, 41 are suitably fixed in the bottom of the body 1 by fasteners as at 51 fixed by welding, not shown, to the body 1.

Preferably, the wheels 21, 23 are fixed on the axles 27, 29 by keys, not shown, on said wheels accommodated by keyways 53 in said axles and hub caps 55 threaded into the outer ends of the axles.

The series of axles 27 are connected for simultaneous drive of the series of wheels 21 by sprocket and chain drives 57 including integral twin sprocket wheels 59 in the forked bearings 31 fixed to said axles 27 by set bolts 60 and the series of axles 29 are similarly connected by sprocket and chain drives 61 including integral twin sprocket wheels 63 in the forked bearings 33 fixed to said axles 29 by set bolts 65.

A transverse drive shaft 67 at the rear of the body 1 above the series of shafts 27, 29 extends beneath the rear pair of transverse recesses 15 and through the keel portion 7 of the body 1. The drive shaft 67 is journaled in forked bearings 68, 69 like the bearings 31, 33 fixed to the body 1 in the same manner. The drive shaft 67 is also journaled in a bearing 71 in a housing 73 in the keel portion 7 for a suitable motor 75 drivingly connected to said shaft 67 through a conventional transmission and reverse 77 and controlled by a suitable lever 79 operated by a control rod 81 extended in any suitable manner, not shown, to the cab 17.

Dual or twin pairs of side traction wheels 83, 85 like the series of wheels 21, 23 are mounted in the same manner as the wheels 21, 23 on the drive shaft 67 coplanar with the series of wheels 21, 23 and constitute rear end climbing traction and lifting paddle wheels of the vehicle working in the recesses 15.

The drive shaft 67 is operatively connected to the rearmost of the series of axles 27, 29 by sprocket and chain drives 87, 89 including sprocket wheels 91, 93 in the forked bearings 68, 69 and sprocket wheels of the pairs 59 on said rearmost axles of series 27, 29.

A pair of front transverse axles 95, 97 extend beneath the front transverse recesses and are journaled in forked bearings 99, 101 like the forked bearings 31, 33, 68, 69 and mounted on the body in the same manner. Dual or twin pairs of side traction wheels 103, 105 like the wheels 21, 23, 83 and 85 and mounted on the axles 97, 99 in the same manner provide front end pairs of climbing traction and paddle wheels on said body 1 above and in front of the series of wheels 21, 23 coplanar therewith and working in the front recesses 13.

The foremost axles of the series 27, 29 are operatively connected to the axles 95, 97 by sprocket and chain drives 107, 109 including sprocket wheels 61 of the pairs on said axles 27, 29 and sprocket wheels 111, 113 fixed in said axles 95, 97 in the same manner as the other sprocket wheels.

Suitable slack take-up devices 115, 117 are provided on the body 1 for the sprocket chains of the sprocket and chain drives 107, 109, 87, 89.

As will be understood, the dual or twin driving wheels 21, 85, 103 are arranged on one side of the body 1 in a common vertical plane and the wheels 23, 83, 105 on the other side of the body in a common vertical plane and all of said dual or twin wheels are preferably of the same size and are driven at the same speed.

In operation on land, the main dual or twin driving wheels dig into and grip the ground and serve as highly efficient traction wheels, whereas in water, said wheels function as buoyant series of paddle wheels for propelling the vehicle in water. The front side driving wheels 103, 105 function when the vehicle is climbing out of a stream or traveling over mounds or the like to lift the front end of the vehicle and the rear side driving wheels 83, 85 function in a like manner when the vehicle is backing. These side driving wheels 103, 105, 83, 85 when the vehicle is in water function as lifting paddle wheels by their buoyancy and to facilitate progress of the vehicle over obstructions in the water, such as rocks or sand bars and the like.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the appended claims.

What is claimed as new is as follows:

1. A combination land and water vehicle comprising a buoyant elongated body having ends and sides, said sides being undercut to provide a longitudinal central keel portion on said body of uniform width and extending from end to end of said body, and longitudinal bottom recesses in said body at opposite sides of said keel portion forming overhanging side portions on said body over said recesses, a series of twin side driving pontoon wheels working in each side recess and spaced along the same, series of axles from the series of twin wheels, bearings for said axles depending from said overhanging portions into said recesses, said wheels having combined cleats and paddles therein, and drive means for operating said wheels in unison.

2. The combination of claim 1, said ends of the body being undercut to provide front and rear pairs of transverse recesses in the front and rear ends of said body at opposite sides of said keel portion, front and rear pairs of lifting combined traction and paddle wheels in the front and rear pairs of recesses above the first named wheels, axles for said front and rear pairs of lifting wheels, bearings for said last named axles depending from said overhanging portions into said front and rear recesses, and driving connections between end axles of said series and the axles for the front and rear pairs of lifting wheels.

3. The combination according to claim 1, said bearings comprising cushioned bearing forks for each axle, said drive means comprising sprocket and chain drives between said series of axles including twin sprocket wheels rotating in said forks.

4. The combination of claim 3, said bearing forks having vertical shanks vertically slidable and cushioned in vertical sleeves fixed to said body.

5. The combination of claim 4, said shanks being square in cross-section and sliding in upper and lower sets of roller bearings in said sleeves arranged horizontally in rectangular formation.

References Cited in the file of this patent

UNITED STATES PATENTS

| | | |
|---|---|---|
| 1,836,446 | Christie | Dec. 15, 1931 |
| 2,497,857 | Benson | Feb. 21, 1950 |
| 2,503,111 | Higgins | Apr. 4, 1950 |